OR 3,851,948

United State

Gange et al.

[11] 3,851,948

[45] Dec. 3, 1974

[54] HOLOGRAPHIC THERMOPLASTIC MEMORY SYSTEM

[75] Inventors: Robert Allen Gange, Belle Mead; Eugene Michael Nagle, Middletown; Carl Charles Steinmetz, Mercerville, all of N.J.

[73] Assignee: RCA Corporation, New York, N.Y.

[22] Filed: Aug. 3, 1973

[21] Appl. No.: 385,305

[52] U.S. Cl. ................ 350/3.5, 96/1.1, 178/6.6 TP, 340/173 TP, 346/77 E, 355/9

[51] Int. Cl. ........................................... G02b 27/00

[58] Field of Search .......... 340/173 TP; 178/6.6 TP; 96/1.1; 350/3.5; 355/9; 346/77 E, 76 L

[56] References Cited

UNITED STATES PATENTS

| | | | |
|---|---|---|---|
| 3,334,353 | 8/1967 | Everest | 346/76 L |
| 3,560,205 | 2/1971 | Urbach | 350/3.5 |
| 3,735,031 | 5/1973 | Waters | 178/6.6 TP |
| 3,787,873 | 1/1974 | Sato et al. | 340/173 TP |

OTHER PUBLICATIONS

Chang et al., IBM Technical Disclosure Bulletin, Vol. 10, No. 4, Sept. 1967, pp. 397–398.

*Primary Examiner*—Ronald J. Stern
*Attorney, Agent, or Firm*—Edward J. Norton; Carl V. Olson

[57] ABSTRACT

A holographic memory system includes a transparent thermoplastic recording medium having a large area for the storage of a large number of individual holograms, a photoconductive layer, and at least one layer providing light absorption, electrical conductivity and physical support. The entire area of the thermoplastic storage medium is heated to a temperature just below the temperature at which the medium becomes plastic, and a uniform electric charge is placed on the thermoplastic recording medium. Means are provided to direct an object beam and a reference beam forming an individual hologram to and through a single selected small area of the storage medium and the photoconductor, whereby an electrically-conductive pattern is formed in the photoconductive layer which results in a corresponding charge pattern thereon. The object beam and the reference beam continue on to the light absorption layer, whereby heat generated in the light absorption layer causes solely the small area of the recording medium to become plastic, so that it can assume a physical pattern determined by the charge pattern.

6 Claims, 2 Drawing Figures

HOLOGRAPHIC THERMOPLASTIC MEMORY SYSTEM

The invention described herein was made in the performance of work under a NASA contract and is subject to the provisions of Section 305 of the National Aeronautics and Space Act of 1958, public law 85–568 (72 STAT 435; 42 U.S.C. 2457).

BACKGROUND OF THE INVENTION

It has been proposed to construct an optical memory in which holographic images are recorded as ripple patterns on a thermoplastic recording medium which is arranged in a sandwich with a photoconductor layer and an electrical conductor layer. The recording is made by forming a uniform electric charge on the surface of the thermoplastic. The recording medium is then uniformly heated by a current through the electrical conductor to soften the thermoplastic. Then an information object beam and a reference beam are directed through the thermoplastic layer to the photoconductor layer, whereby the holographic pattern of conductivity alters the charge pattern and causes a holographic ripple pattern in the surface of the softened thermoplastic. The thermoplastic is then cooled to freeze the holographic ripple pattern in the surface of the thermoplastic.

In a memory system of the type described, it is desirable to employ a large thermoplastic recording medium for the storage of a large number of separate holograms each containing many bits of digital information. It is further desirable that the system permit each hologram to be separately erased and replaced by a different hologram without affecting any of the other stored holograms.

SUMMARY OF THE INVENTION

According to an example of the invention, an optical memory is constructed with a large thermoplastic recording medium, having spaces for a large number of individual holograms. Optical deflection means is provided to project a hologram onto any one of the spaces therefor. The entire thermoplastic recording medium is heated to a temperature just slightly below the softening temperature, and the thermoplastic recording medium is provided with a light absorber layer so that an optically projected hologram causes a softening of the thermoplastic at solely the addressed holographic space thereon. A single individual hologram can thus be erased and replaced without disturbing the other recorded holograms.

DESCRIPTION OF PREFERRED EMBODIMENT

Figure 1:
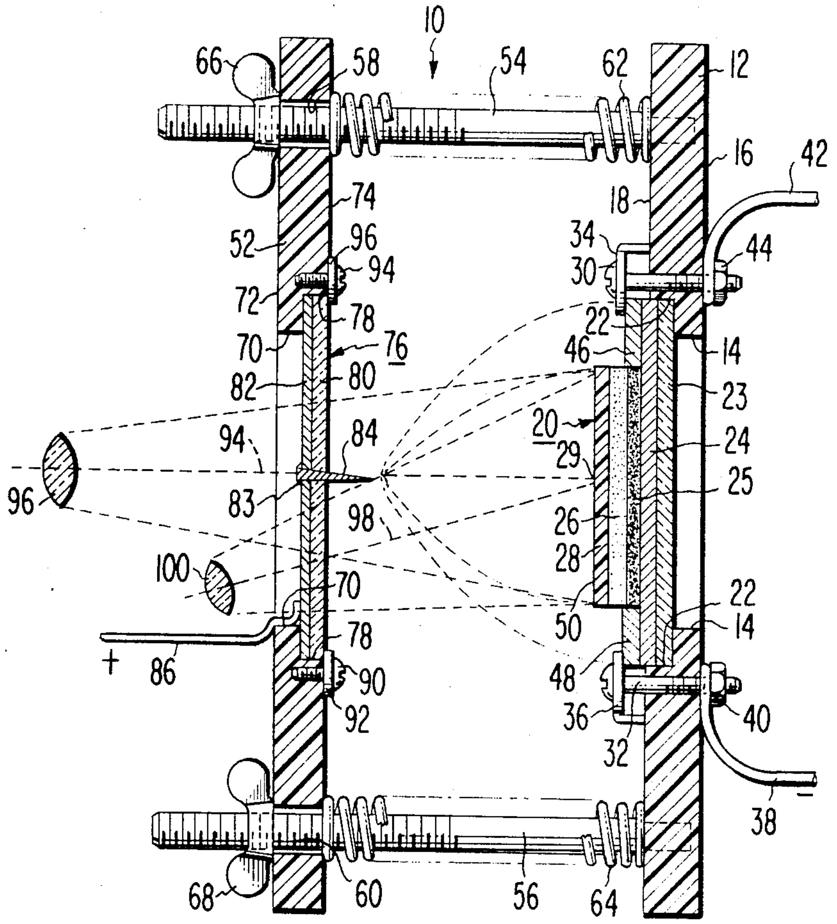
FIG. 1 is a sectional view of a holographic thermoplastic memory system according to the teachings of the invention.

Referring now to the drawing, there is shown a device 10 which includes front wall 12 of a transparent plastic material, such as "plexiglass," that is a good electrical insulator. The front wall 12 is, for example, about 10 centimeters square and is formed with a central square opening 14 of about 6 centimeters square. The front wall 12 has an outer surface 16 and an inner surface 18. A square recording device 20 is disposed in a recess 22 in the inner surface 18 adjacent the opening 14 of front wall 12.

The square recording device 20 typically comprises a substrate 23, a transparent coating 24 of electrically conductive material, a light absorbing layer 25, a photoconductive layer 26, and a layer 28 of thermoplastic material. The substrate 23 is preferably transparent and may comprise glass or a transparent plastic material, such as "Mylar," for example. The conductive coating 24 is preferably a coating of InO, having a conductivity of about 100 ohms per square inch. The conductive coating 24 may alternatively be a thin transparent coating of a vacuum deposited metal, such as aluminum, for example. The photoconductive layer 26 is preferably a layer of polyvinyl carbazole (PVK), having a thickness of about 2 microns. The light absorbing layer should have a composition and thickness so that it neither transmits nor reflects light, but rather absorbs light. Black gold is a preferred material for the light absorbing layer. The thermoplastic layer 28 can be a microcrystalline straight chain hydrocarbon wax, having a thickness of between 1 and 1½ microns. The thermoplastic may be a nonfatiguable linear hydrocarbon material as described in copending application Ser. No. 309,754 filed on Nov. 27, 1972, by Robert A. Gange and entitled "An Improved Holographic Recording Medium." Nonfatiguable linear hydrocarbons useful as the electrically alterable layer have low molecular weights, i.e., about 300 to about 2,000, which preferably are solid at room temperature but which have low softening points. Suitable materials include microcrystalline natural waxes or low molecular weight, linear polymers of ethylene.

These hydrocarbons are straight chains of -$CH_2$- units, substantially without branched chains, unsaturation, or active end groups. They are further characterized by a narrow molecular weight distribution, that is, most of the molecules of the resin have similar chain lengths. Suitable commercial products include Boreco Polywax, a linear polyethylene available in molecular weights in the range about 1,000 to about 2,000 and "Be Square" 190/195 Amber or No. 1 white microcrystalline waxes having about 60 carbon atoms per molecule, available from the Boreco Division of Petrolite Corporation. These materials have melting points between about 40° C. and about 125° C.

Although the reason for the efficacy of the present materials is not completely understood, it is believed the straight chain configuration is responsible for the long life of the recording medium described herein, since little cross-linking or reaction between end groups of these straight chain molecules occurs in the presence of high electric fields throughout numerous cycles of softening and hardening or heating and cooling.

The recording device 20 is held in the recess 22 by any suitable means as, for example, by screws and washers adjacent each of the corners of the recording device 20. Thus, for example, upper and lower screws 30 and 32 and washers 34 and 36 hold the recording device 20 in the recess 22. Two other screws (not shown) are disposed adjacent the other two corners of the square recording device 20 in the other half (not shown) of the symmetrical device 10.

Means are provided to apply a voltage to the recording device 20 and also to send current through the conductive coating 24 to heat the recording device 20 so as to cause the thermoplastic coating 28 to soften for the purpose of making a ripple image therein. To this end, an electrical conductor 38 is connected to the lower screw 32 by means of a nut 40. A conductor 42 is also connected to the upper screw 30 by means of a nut 44. A pair of chromium-gold lands 46 and 48 are disposed on the conductive coating 24, adjacent the upper and lower edges of the photoconductive layer 26. The upper and lower washers 34 and 36 are adapted to contact the upper and lower lands 46 and 48 so that the conductor 38 can be connected to the conductor 42 through the conductive coating 24 and the screws 32 and 30.

Means are provided to apply a substantially uniform electrostatic charge on the surface 50 of the thermoplastic layer 28 of the recording device 20. To this end, a rear wall 52, substantially similar to the front wall 12, is parallel to, and adjustably spaced from, the front wall 12. A separate screw is threaded adjacent each of the corners of the front wall 12 and each of the screws extends outwardly from the inner surface 18. Thus, in the symmetrical half of the device 10 shown, an upper screw 54 and a lower screw 56 (two of four such screws of the device 10) extend outwardly from the inner surface 18 of the front wall 12. The rear wall 52 is formed with four holes adjacent each of its corners and adapted to receive the screws slidably therein. Thus, the upper screw 54 passes through a hole 58, and the lower screw 56 passes through a hole 60 in the rear wall 52. The rear wall 52 is urged away from the front wall 12 by springs around the screws, such as a spring 62 around the upper screw 54 and a spring 64 around the lower screw 56. The rear wall 52 can be moved toward and away from the front wall 12 by turning wing nuts 66 and 68 threaded on the screws 54 and 56.

The square rear wall 52 is formed with a square opening 70 that is substantially aligned with the opening 14 in the front wall 12. The rear wall 52 has an outer surface 72 and an inner surface 74. A square conductive plate 76 is supported in a recess 78 formed in the inner surface 74 of the rear wall 52 adjacent the opening 70. The conductive plate 76 comprises a sheet 80 of transparent material, such as glass, having a conductive coating 82, such as tin oxide or indium oxide thereon.

A pointed member 84, such as an electrically conductive needle point, about 10 mm in length, is disposed in the center of the transparent conductive plate 76 through a hole formed, e.g. ultrasonically drilled, in the sheet 80. The pointed member 84 extends perpendicularly from the conductive plate 76, points toward the recording device 20, and is electrically connected to the electrically conductive coating 82 by means of a conductive paste 83, for example.

Means are provided to apply a source of corona producing voltage to the conductive plate 76. To this end, an electrical conductor 86 is electrically connected to the conductive coating 82 by any suitable means such as soldering. A screw 90 passes through the rear wall 52, and a washer 92 on the screw 90 is adapted to hold one corner of the conductive plate 76 within the recess 78. A separate screw and washer, such as the screw 94 and washer 96, is disposed at each of the other corners of the conductive plate 76 to hold it firmly within the recess 78 of the rear wall 52.

The corona discharge device 10 can be used in a method of forming a phase modulating hologram on the deformable thermoplastic layer 28 of the recording device 20, as described, for example, in U.S. Pat. No. 3,560,205, issued to J. C. Urbach, on Feb. 2, 1971, for "METHOD OF FORMING A PHASE MODULATING HOLOGRAM ON A DEFORMABLE THERMOPLASTIC," and as described in U.S. Pat. No. 3,809,974 issued to R. A. Gange on May 7, 1974, for "Corona Discharge Device."

OPERATION

In operation, the rear wall 52 is spaced from, and disposed parallel to, the front wall 12 by adjusting the wing nuts 66 and 68 (and the wing nuts, not shown) until the pointed member 84 is a desired distance from the surface 50 of the thermoplastic layer 28 to be charged. In practice, it has been found that when the pointed member 84 is about three centimeters from the surface 50, and a corona producing, unidirectional voltage of about 15 kilovolts is applied between the conductors 86 and 38, a four square centimeter area on the surface 50 will be substantially uniformly charged. The pointed member 84 is usually positive with respect to the conductive coating 24 (when the photoconductive layer 26 is PVK) but the polarity may be reversed if so desired. The further the pointed member 84 is from the surface 50 of the recording device 20, the greater the voltage which must be applied between the conductors 86 and 38.

Figure 2:
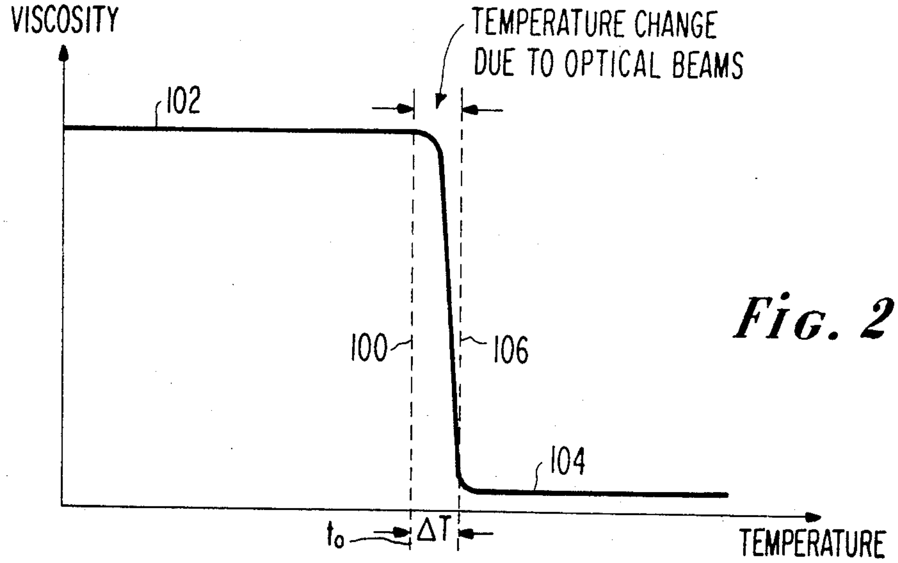
FIG. 2 is a chart that will be referred to in describing how the thermoplastic recording medium used in the system of FIG. 1 responds to changes in temperature.

A source of voltage (not shown) is connected across the conductors 38 and 42 to cause a current through the conductive coating 24. The current causes the generation of heat in the coating which is conveyed through the photoconductive layer 26 to the thermoplastic recording medium 28. The heating means is adjusted to maintain the temperature of the entire thermoplastic recording medium at the value 100 shown in FIG. 2. The thermoplastic material 28, which may be microcrystalline straight chain wax, is selected to have an abrupt transition, with increasing temperature, from a solid or high viscosity condition 102 to a soft or molten condition 104.

The thermoplastic recording medium is large enough to have room for the storage of a number of separate individual holograms. One hologram, for example, may be created at the elemental area 29 in FIG. 1 by the cooperative action of an object beam passed through lens 96 and a reference beam passed through lens 100. Or, the beams may be deflected to converge at any other desired elemental area on the thermoplastic recording medium 28. The means for forming and deflecting the object and reference beams may be as described in U.S. Pat. No. 3,656,121 issued on Apr. 11, 1972 to J. A. Rajchman etal.

When an object beam and a reference beam are directed to one selected elemental holographic storage area on the thermoplastic recording medium 28, the light passes through the thermoplastic layer to the photoconductive layer 26, whereby the layer is rendered electrically conductive from point-to-point in a pattern corresponding with the intensity of light in the optical pattern. Points in the photoconductive layer which are thus made electrically conductive conduct charge from adjacent points on the thermoplastic recording medium 28 to the electrically conducting layer 24, so that the remaining charge pattern corresponds with the optical pattern projected thereto.

The charge pattern tends to cause the thermoplastic recording medium to become deformed or rippled in accordance with the charge pattern and the original optical pattern. However, the entire thermoplastic layer 28 is initially solid and not able to respond to the charge pattern. But, the thermoplastic at the elemental storage area on the thermoplastic layer 28 to which a single hologram is projected is rendered soft or plastic by the projected light itself. The optical pattern passes through the thermoplastic layer, and the photoconductive layer 26 to the light absorbing layer 25. The light energy is translated to heat which raises the temperature of the thermoplastic layer 28 in the region of the incident light from temperature 100 in FIG. 2 to temperature 106 at which the thermoplastic is soft or molten.

The heating of the thermoplastic is aided by the fact that the photoconductive layer 26 when impinged by light becomes increasingly heat conductive, as well as electrically conductive. So the heat released by the light abosrbing layer 25 is conducted to the thermoplastic layer 28 in the region where the light is incident. The heated thermoplastic is soft and caused to be ripple in accordance with the image charge pattern on the thermoplastic. When projection of the optical image is stopped, the thermoplastic cools and the ripple pattern is frozen in the thermoplastic. The frozen pattern can then be optically read out as often as desired with a low intensity reference beam without erasing the stored holographic image.

It is therefore apparent that the light absorbing layer 25 operates to generate a sufficient amount of heat from the optical image being recorded to soften the thermoplastic and permit the recording of the optical image, without disturbing previously recorded images frozen at adjacent elementary storage locations on the thermoplastic recording medium 28.

What is claimed is:

1. A holographic memory system, comprising
a multi-layer holographic storage device including a transparent thermoplastic recording medium having a large area for the storage of a large number of individual holograms, a photoconductive layer, and at least one layer providing light absorption, electrical conductivity and physical support,
means to heat the entire area of said thermoplastic storage medium to a temperature just below the temperature at which said medium becomes plastic,
means to place a uniform electric charge on said thermoplastic recording medium, and
means to direct an object beam and a reference beam forming an individual hologram to and through a single selected small area of said storage medium and said photoconductor, whereby an electrically conductive pattern is formed in said photoconductive layer which results in a corresponding charge pattern thereon, said object beam and reference beam continuing on to said light absorption layer, whereby heat generated in said light absorption layer causes solely said small area of said recording medium to become plastic, so that it can assume a physical pattern determined by said charge pattern.

2. A holographic memory system as defined in claim 1 wherein said thermoplastic recording medium is a microcrystalline wax.

3. A holographic memory system as defined in claim 1 wherein said thermoplastic recording medium is chosen from the group consisting of synthetic straight chain hydrocarbon microcrystalline wax and polyethylene each having a molecular weight in the range between 1,000 and 2,000.

4. A holographic memory system as defined in claim 1 wherein said layer providing light absorption includes black gold.

5. A holographic memory system as defined in claim 2 wherein said layer providing light absorption includes black gold.

6. A holographic memory system as defined in claim 1 wherein said means to heat the entire area of the thermoplastic recording medium comprises means to pass an electric current through said layer having electrical conductivity.

* * * * *